(12) United States Patent
Wilking et al.

(10) Patent No.: US 12,061,712 B2
(45) Date of Patent: Aug. 13, 2024

(54) PERSISTED DATA VIEWS SUPPORTING ACCESS CONTROL

(71) Applicant: SAP SE, Walldorf (DE)

(72) Inventors: Michael Wilking, Dublin (IE); Michael te Uhle, Wiesloch (DE); Florian Maier, Heidelberg (DE); Ioannis Kostis, Heidelberg (DE); Atul Rajendra Prasad Tiwari, Hockenheim (DE); Leonardo Silva Rosa, Porto Alegre (BR)

(73) Assignee: SAP SE, Walldorf (DE)

( * ) Notice: Subject to any disclaimer, the term of this patent is extended or adjusted under 35 U.S.C. 154(b) by 91 days.

(21) Appl. No.: 17/514,983

(22) Filed: Oct. 29, 2021

(65) Prior Publication Data

US 2023/0022454 A1   Jan. 26, 2023

Related U.S. Application Data

(60) Provisional application No. 63/225,646, filed on Jul. 26, 2021.

(51) Int. Cl.
   *G06F 21/62*     (2013.01)
   *G06F 16/23*     (2019.01)
   *G06F 21/60*     (2013.01)

(52) U.S. Cl.
   CPC ...... *G06F 21/6227* (2013.01); *G06F 16/2393* (2019.01); *G06F 21/604* (2013.01); *G06F 2221/2141* (2013.01)

(58) Field of Classification Search
   CPC ............. G06F 21/6227; G06F 16/2393; G06F 21/604; G06F 2221/2141
   See application file for complete search history.

(56) References Cited

U.S. PATENT DOCUMENTS

| | | | | |
|---|---|---|---|---|
| 11,630,813 B1* | 4/2023 | Plenderleith | ........ | G06F 16/215 707/609 |
| 2005/0289144 A1* | 12/2005 | Dettinger | ........... | G06F 21/6227 707/999.009 |
| 2010/0281060 A1* | 11/2010 | Ahmed | ............... | G06F 21/6227 707/805 |
| 2014/0172827 A1* | 6/2014 | Nos | ..................... | G06F 16/2423 707/722 |
| 2021/0318998 A1* | 10/2021 | Filip | .................... | G06F 16/245 |
| 2022/0156250 A1* | 5/2022 | Zukowski | ......... | G06F 16/24573 |

* cited by examiner

*Primary Examiner* — Kevin Bechtel
*Assistant Examiner* — Forrest L Carey
(74) *Attorney, Agent, or Firm* — Fountainhead Law Group, PC

(57) ABSTRACT

Embodiments enforce user access rights to a data view, by initially generating a replication table of the view. The replication table may include all view data to which any user is entitled. This replication table may be generated during a first database session having a first value for a session variable. Next, a data access control structure is applied to the replication table to produce output comprising a subset of the view data for a specific user. This output may be produced during a second database session having a second value for the session variable. By initially generating the view replication table up front, processing resources are conserved in later stages when access control structures are applied to grant view access rights to particular users. Alternative embodiments may implement access control to data views, through the creation and storage of derived views.

20 Claims, 14 Drawing Sheets

PERSISTED DATA VIEWS SUPPORTING ACCESS CONTROL

CROSS-REFERENCE TO RELATED APPLICATION

The instant nonprovisional application claims priority to the U.S. provisional patent application No. 63/225,646, filed Jul. 26, 2021 and incorporated by reference in its entirety herein for all purposes

BACKGROUND

Unless otherwise indicated herein, the approaches described in this section are not prior art to the claims in this application and are not admitted to be prior art by inclusion in this section.

The performance of data analytics may involve generating view(s) comprising particular subsets of interest of a larger data corpus. Increasingly, the data corpus and the view data are stored remotely from the user (e.g., in a cloud system).

Reading data from a view can be complicated by various factors, including but not limited to: large data volumes, view model complexity, and/or connectivity to remote systems. And, the imposition of access control measures can offer additional challenges to data analytics efforts, especially when applied to data that is stored remotely on the cloud.

SUMMARY

Embodiments enforce user access rights to a data view, by initially generating a replication table of the view. The replication table may include all view data to which any user is entitled. This replication table may be generated during a first database session having a first value for a session variable. Next, a data access control structure is applied to the replication table to produce output comprising a subset of the view data for a specific user.

This output may be produced during a second database session having a second value for the session variable. By initially generating the view replication table up front, processing resources are conserved in later stages when access control structures are applied to grant view access rights to particular users. Embodiments may be particularly useful in allowing a first user having restricted access rights, to usefully share a view with a second user having broader access. Alternative embodiments may implement access control to data views, through the creation and storage of derived views.

The following detailed description and accompanying drawings provide a better understanding of the nature and advantages of various embodiments.

DETAILED DESCRIPTION

Described herein are methods and apparatuses that implement data view persistence in support of access control measures. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Figure 1:
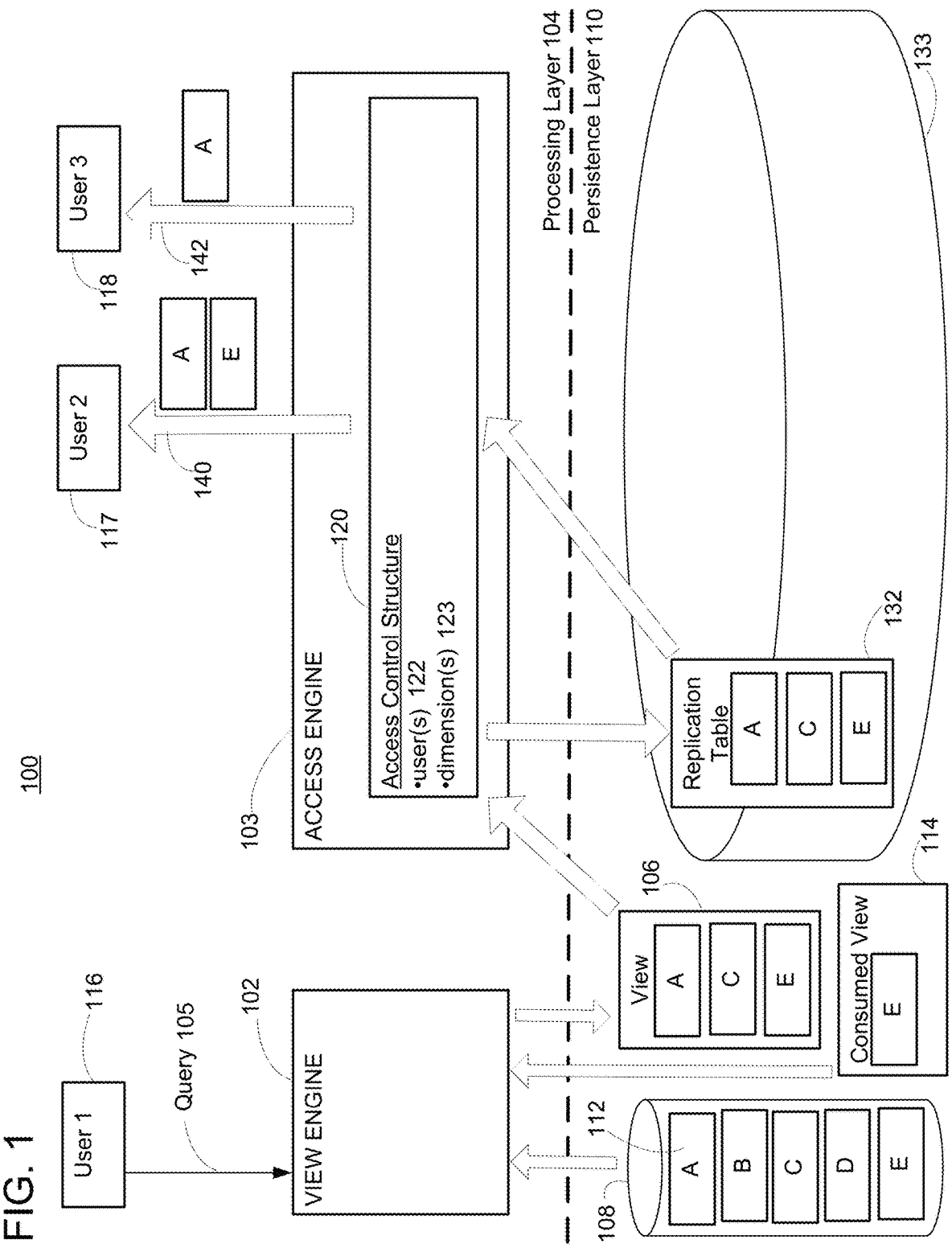
FIG. 1 shows a simplified diagram of a system according to an embodiment.

FIG. 1 shows a simplified view of an example system that is configured to implement data access controls through view persistency according to an embodiment. Specifically, system 100 comprises a view engine 102 and an access engine 103 that are positioned in a processing layer 104.

The view engine is configured to receive a query 105 comprising parameters. The view engine then creates a corresponding view 106 from a data corpus 108 that is stored in persistence layer 110.

Here, the simplified data corpus comprises data pieces 112 A-E. The view comprises the data subset A, C, and E matching the parameters of the query.

As shown in FIG. 1, the view engine may construct the view by retrieving matching data directly from the corpus. Moreover, in order to leverage query processing that has previously already taken place, the view engine may further construct the view by retrieving data from an existing view(s) 114. Data from that consumed view may contribute to the latest view, without having to perform time consuming processing of the (often voluminous) original data corpus.

Rights to access data of the view may be restricted to particular users. For example, here a first user 116 that is originally calling the view, may be a relatively low-level employee having rights to access to only data A.

By contrast, a second user 117 may have a higher level role allowing access to both A and E. Third user 118 may again have the right to access A (but not C or E).

Details regarding such per-user access rights, are encoded within access control structure 120. In addition to restricting data access per-user 122, the access control structure may also be specific to one or more dimensions 123 of the data comprising the view.

According to embodiments, access rights to the data of the view are enforced by the access engine 103. The access engine is responsible for persisting data into a replication table 132, and providing access according to the access control structure(s).

The access engine receives the view, and references the access control structure in order to create the replication table 132 of the view. The replication table is stored in non-transitory computer readable storage medium 133 that is part of the persistence layer.

As described below, particular embodiments may generate the view replication table by first switching the access control structure into a special mode (e.g., using a first database session having a first session variable).

In some embodiments, both the view and the access control structure may be in the form of relational database objects. Accordingly, generation of the replication table may result from a database operation such as a join, union, projection, aggregation, or function.

The replication table includes not only the view data to which the original calling user is entitled to access, but view data to which any user is able to access. In this manner, initial processing of the view data to enforce access rights is performed up front, conserving valuable processing resources.

Lastly, referencing the replication table and the access control structure, the access engine grants to the corresponding user, access to appropriate data of the view. Particular embodiments may grant user access by switching the access control structure back into regular mode (e.g., using a second database session having a second session variable).

Here, user 2 is able to gain access 140 to A and E, and user 3 is able to gain access 142 to only A. In this manner, application of the access control structure to the view replication table serves to enforce user access rights to data contained in a view.

While FIG. 1 shows the access engine receiving a view as input, this is not required. According to other embodiments, the access engine could receive a relational database artifact other than a view as a source object. Examples of such an artifact can include but are not limited to a virtual table or a proxy object that points to a remote data entity using federation capabilities.

Figure 2:
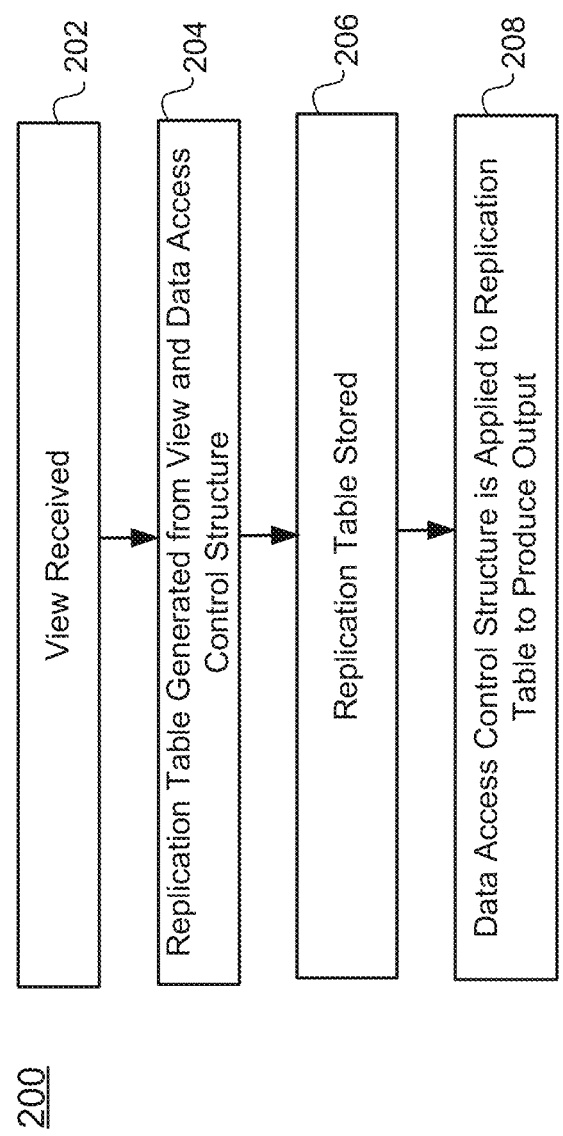
FIG. 2 shows a simplified flow diagram of a method according to an embodiment.

FIG. 2 is a flow diagram of a method 200 according to an embodiment. At 202, a view is received. In some embodiments, the view may be a database table.

At 204, a data access control structure is referenced to generate a replication table of the view. According to particular embodiments, the replication table may include all data of the view to which any user has access rights.

At 206, the replication table is stored in a non-transitory computer readable storage medium.

At 208, the data access control structure is applied to the replication table to produce an output to a user, the output comprising a subset of the plurality of pieces of data.

Systems and methods according to embodiments, may avoid one or more issues that may be associated with view persistence. In particular, embodiments can provide enhanced performance for data analytics.

That is, the burden imposed on processing, memory, and bandwidth by view creation/persistence occurs initially, up-front. Access control measures are then performed subsequently, thereby conserving processing, memory, and bandwidth resources that would otherwise be required to re-create and persist separate views for each user having a different access control type.

Further details regarding data view persistence according to various embodiments, are now provided in connection with the following example.

EXAMPLE

Particular embodiments implementing view persistency, may be understood in connection with the SAP Data Warehouse Cloud (DWC) system available from SAP SE, of Walldorf, Germany. For DWC, Data Access Controls (DACs) are used to apply user specific row level security to views.

A DAC defines which values or value combination of one or multiple dimensions a user is authorized to access. The DAC includes a list of the particular values and/or value combinations for which access is permitted.

In DWC, the DAC is implemented as a SQL table function returning a list of values/value combinations that the calling user is authorized to access. When data is read from a view having a DAC assigned, an inner join between the view and the DAC (list of values/values combinations) is implicitly applied to filter the view result.

Therefore, the calling user will only be able to see that particular view data for which they themselves are authorized. This can interfere with collaboration, for example where a low level user persists a view and seeks to share this view with a supervisor having a broader authorization in the DAC that allows for more data in the view.

According to one approach, embodiments overcome this issue by switching the DACs into a special mode to return all values/value combinations that any user (not just the user calling the view persistency) is authorized for. In this manner, DACs return a superset of the values/value combinations individual user are authorized for, when DACs are switched into the special mode. Thus, when reading data from the view and inserting it into a replication table, the replication table contains all data for which any user is authorized.

DACs assigned to the persisted view and or any consumed view are applied on the altered view that reads data from the replication table. This ensures that for any user reading from the persisted view, only data for which the user is authorized will be returned.

Figure 3:
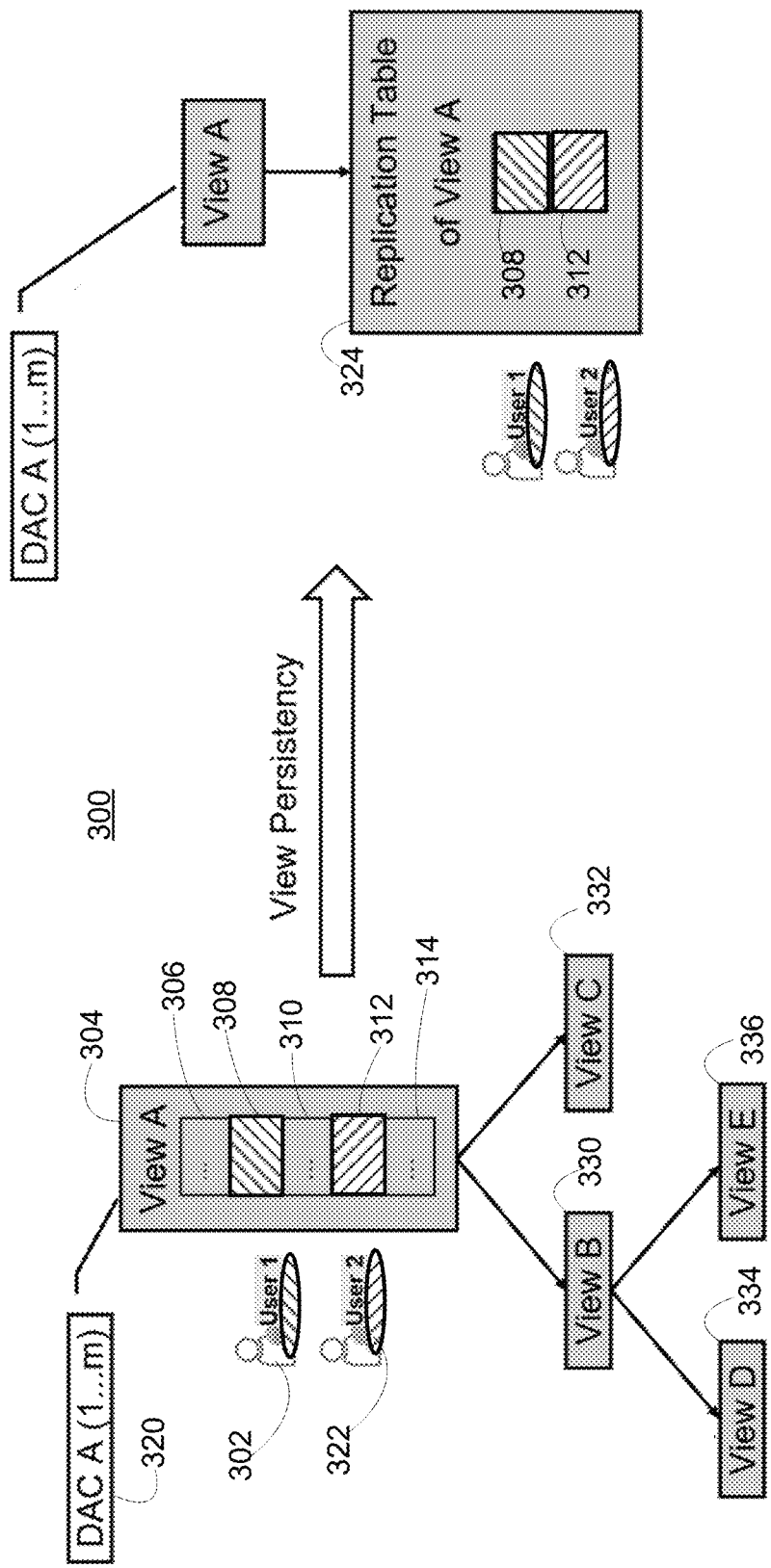
FIG. 3 illustrates view persistency according to an embodiment.

FIG. 3 shows a simplified view of one approach of data view persistency according to an embodiment. This shows a simple scenario 300, where a calling User 1 302 is requesting the persistency of a View A 304 comprising data portions 306, 308, 310, 312, and 314.

DAC A 320 is assigned to the persisted View A. DAC A authorizes all users (including non-calling User 2 322) to have access to the data portions 308 and 312. The data portions 308 and 312 are the superset of the data portions individual users have access to. The approach also works with multiple DACs assigned to the persisted view.

As described above, the DACs are switched into the special mode during view persistency to return all values/value combinations any user is authorized for. In the example of FIG. 3 the DAC A returns in the special mode the values/value combinations that authorize to read the data portions 308 and 312.

As a result, the replica table 324 of View A containing only the data portions 308 and 312, is created by the view persistency implemented according to this embodiment.

After the replica table is created, the view A is altered to read data from the replica table. The DAC A is still assigned to the view A.

Now, when user 1 reads data from the view A 304, the DAC A (that is not in the special mode anymore) authorizes to read only the data portion 308. As the view has been persisted, this data portion is now read from the replica table (rather from the original view).

When user 2 reads data from the view A 304, the DAC A authorizes to read only the data portion 312. Like data portion 308 for user 1, data portion 312 is now also read from the replica table.

Figure 4:
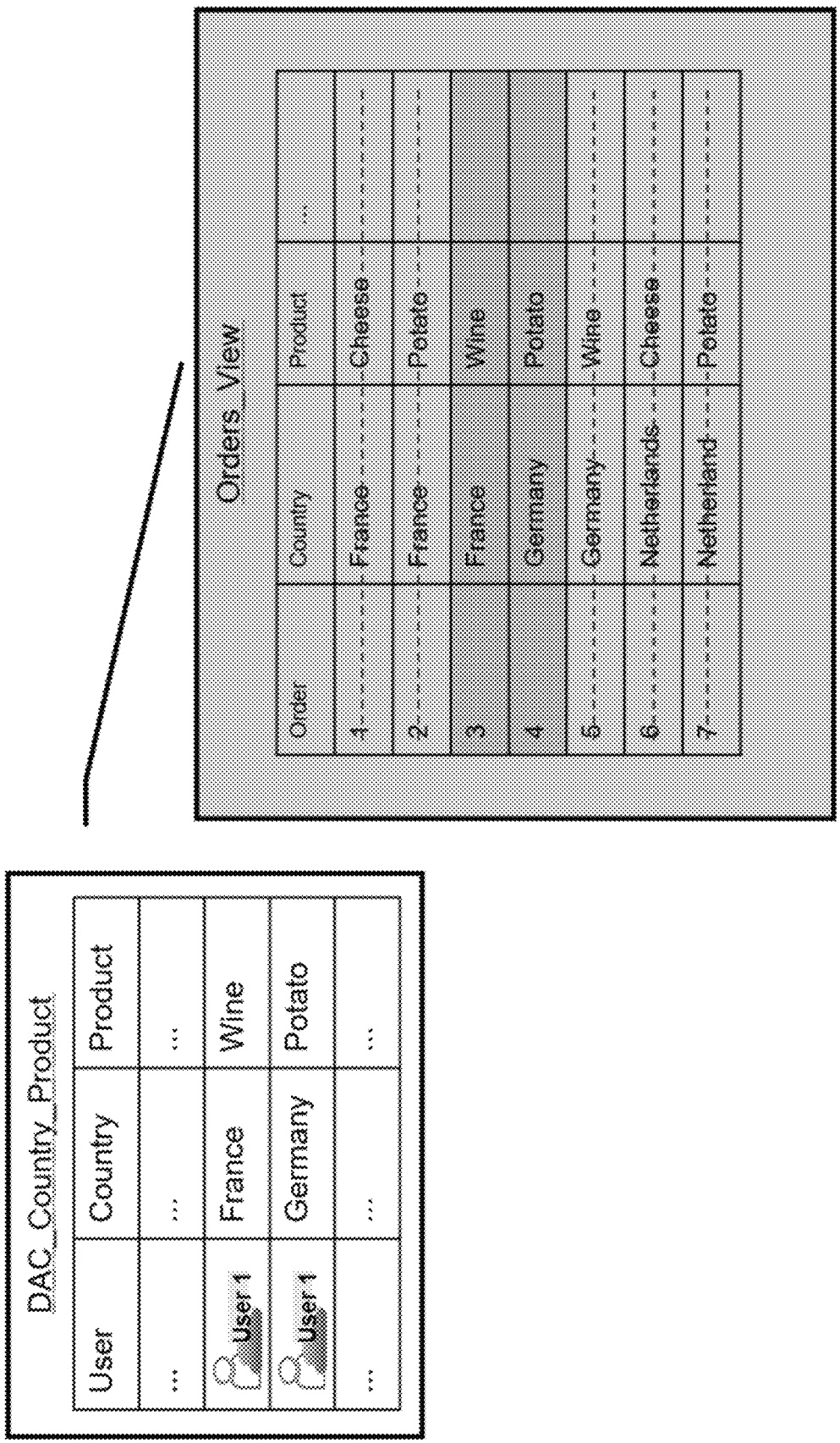
FIG. 4 illustrates an example of one data access control with two dimensions, applied on a view. View persistency is supported by the embodiment of FIG. 3.

FIG. 4 shows details of the use of one DAC with multiple dimensions. Here, the dimensions of the DAC are "Country", and "Product". Thus one DAC with multiple dimensions serves to filter tuples of the dimensions.

Embodiments, however, are not limited to this configuration. Other embodiments may feature multiple DACs.

Figure 5:
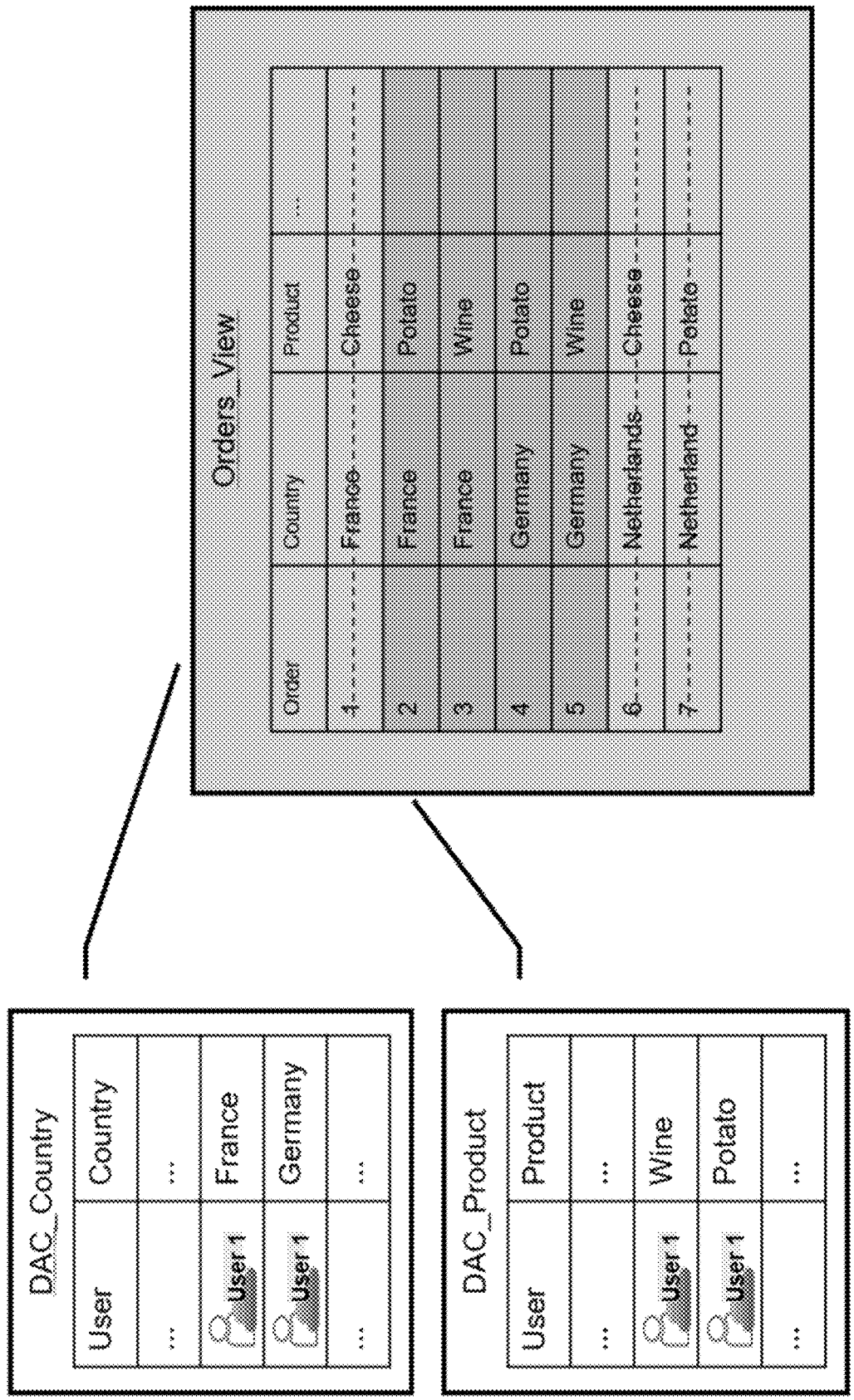
FIG. 5 illustrates an example of two data access controls each with one dimension, applied on a view. View persistency is supported by the embodiment of FIG. 3.

FIG. 5 shows an example of another embodiment using multiple DACs. Here, each DAC has just a single respective dimension ("Country", "Product").

Such multiple DACs with one dimension filter the cartesian product of the sets filtered by the individual DACs. It is noted that different DACs using the same dimension, are intersected.

As mentioned above, called views can consume other views. For example, in the scenario of FIG. 3 the called View A consumes (directly) the other View B 330 and View C 332, and consumes (indirectly) the other Views D 334 and View E 336. The scenario of FIG. 3 is thus simplified in that no DACs are assigned to any of the consumed Views B-E.

Figure 6:
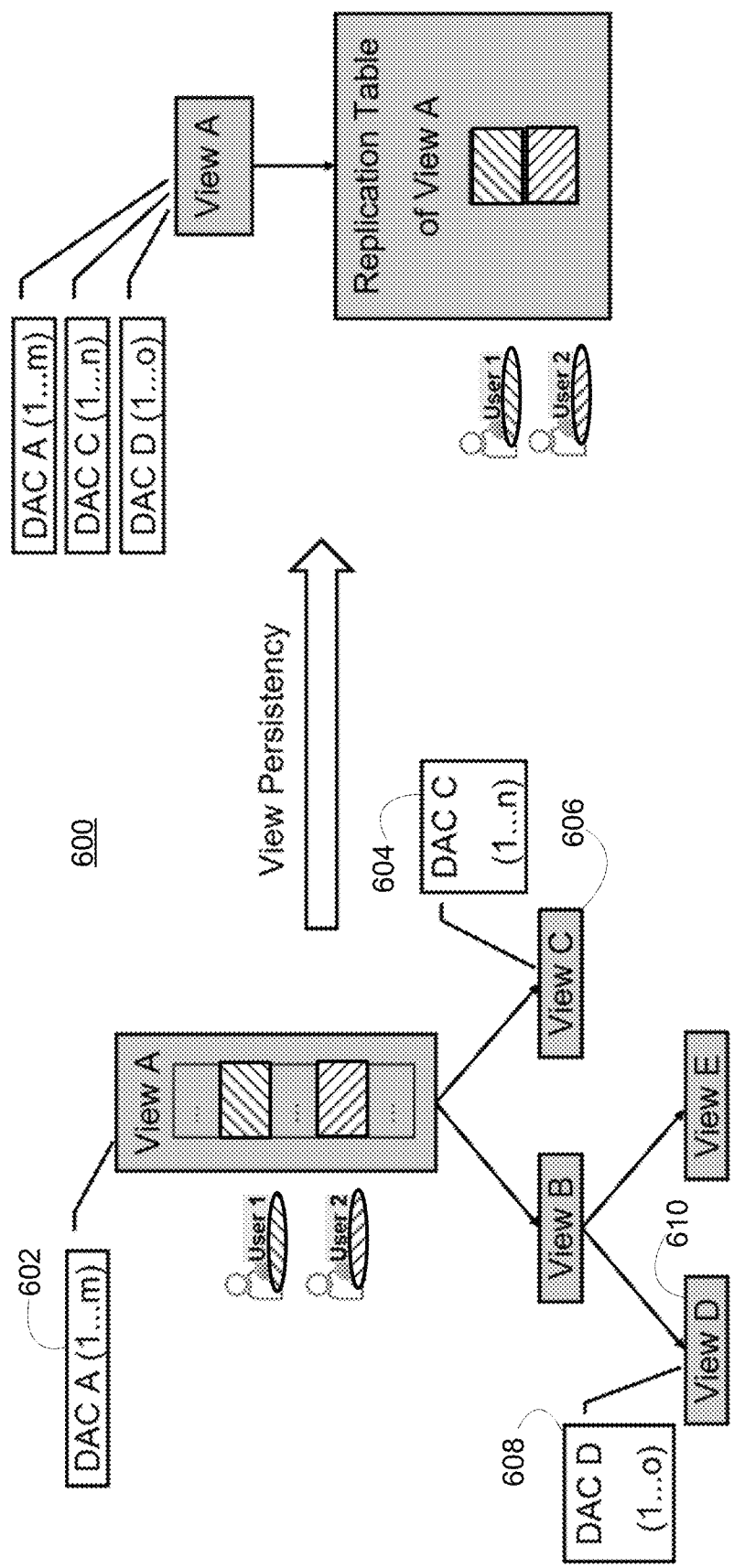
FIG. 6 illustrates view persistency according to another embodiment.

However, FIG. 6 shows a simplified view of another example of data view persistency according to an embodiment. The scenario 600 of FIG. 6 is more complex, with DACs being assigned to multiple views.

That is, one or multiple DACs A 602 are again assigned to the persisted View A. While no DAC is assigned to the consumed Views B or E, one or multiple DACs C 604 are assigned to the View C 606 and one or multiple DACs D 608 is assigned to the View D 610. All DACs A 602, C 604 and D 608 are switched into the special mode when persisting the View A. Afterwards all DACs A 602, C 604 and D 608 are applied on the altered view that reads data from the replica table.

Figure 7:
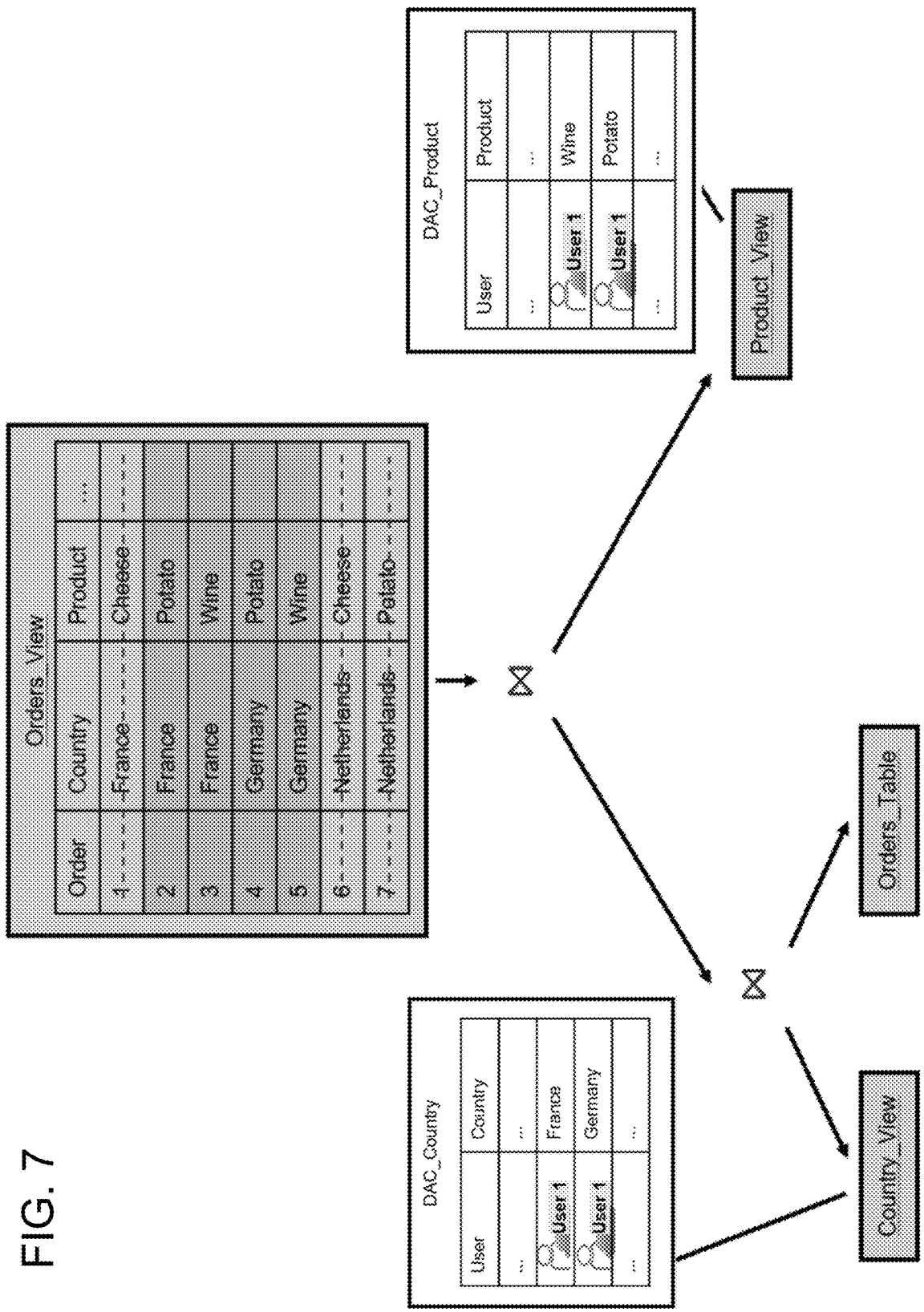
FIG. 7 illustrates one example of data access controls applied on consumed views. For this scenario, view persistency is supported by the embodiment of FIG. 6.

FIG. 7 shows an example of the application of DACs on consumed views. Here, the consumed views are connected by inner joins. DACs on consumed views behave on the top view as if the cartesian product of the sets filtered by the DACs, would be applied as filter to the top view.

Figure 8:
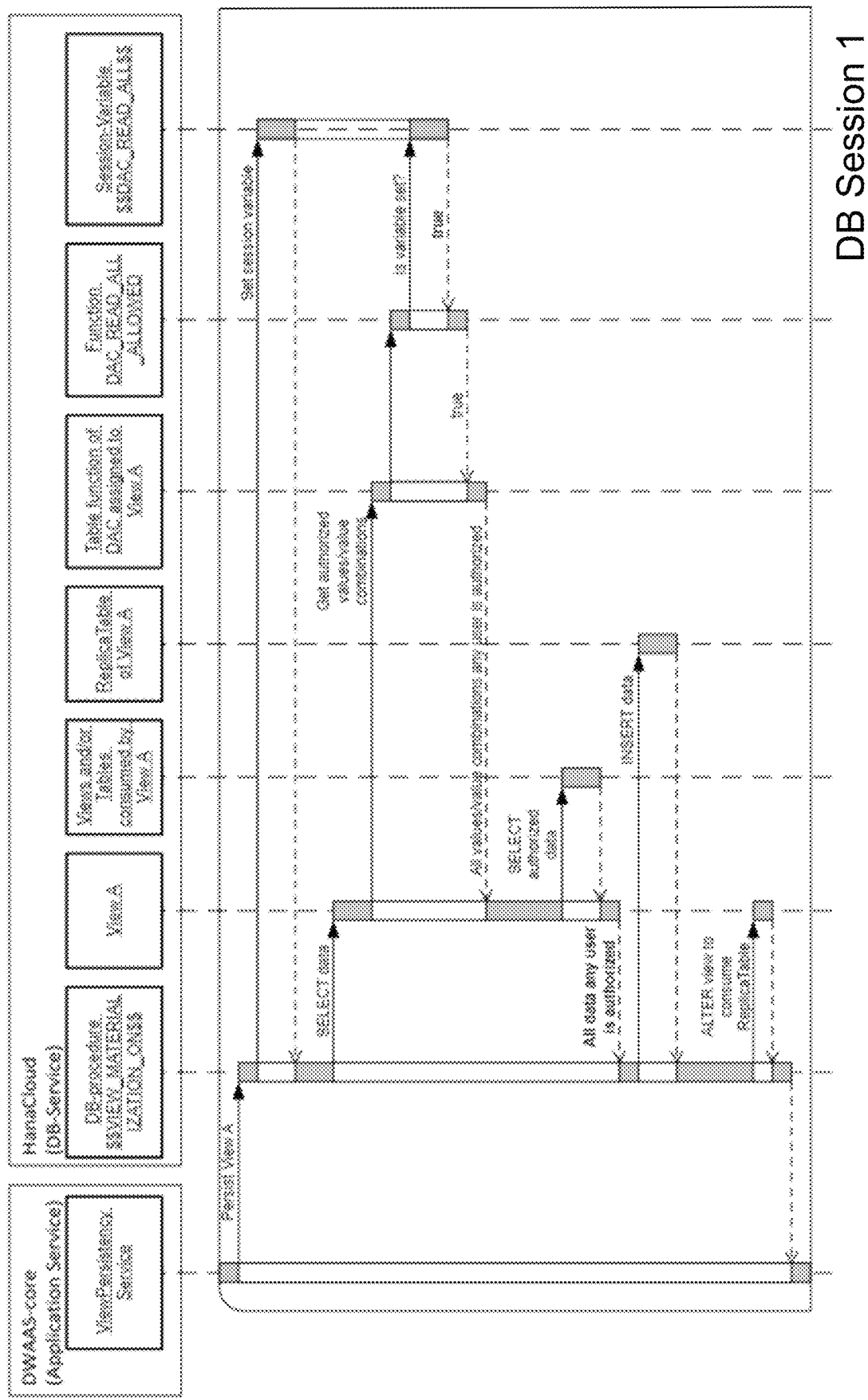
FIGS. 8 and 9 show simplified swim lane diagrams of database sessions implementing view persistency according to the embodiments of FIGS. 3 and 6.
Figure 9:
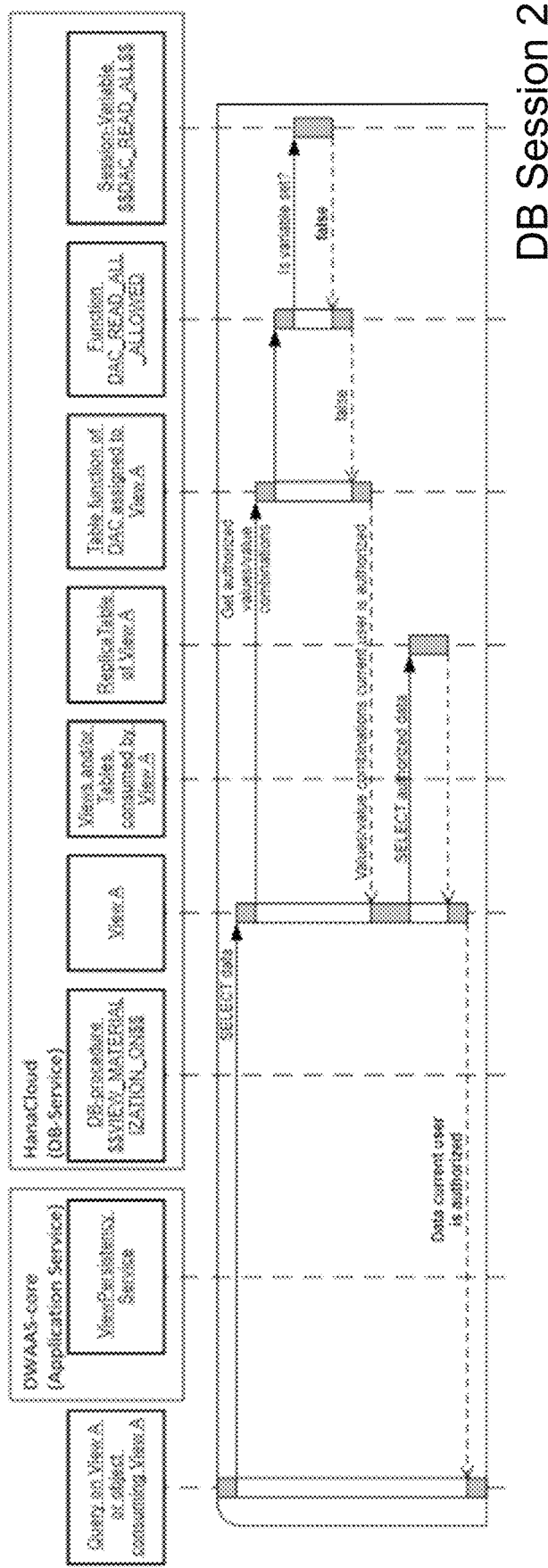

FIGS. 8-9 are simplified swim lane diagrams illustrating handling of the scenario of FIG. 1 utilizing a database session variable. According to this particular embodiment, the session variable is used as a mechanism to switch the DACs into a special mode. As described above the DACs return the values/value combinations any user is authorized for when DACs are running in the special mode. In the illustrated scenario of FIGS. 8-9 only the top view A has a DAC assigned; none of the consumed views has a DAC assigned.

The simplified swim lane diagram of FIG. 8 shows a first database session, where the session variable is employed to create the view replica table including data for which any user is authorized to access. FIG. 9 shows querying or consumption of the view in a second database session involving the view replica table, to return only data of the view that a particular user is authorized to access.

Figure 10:
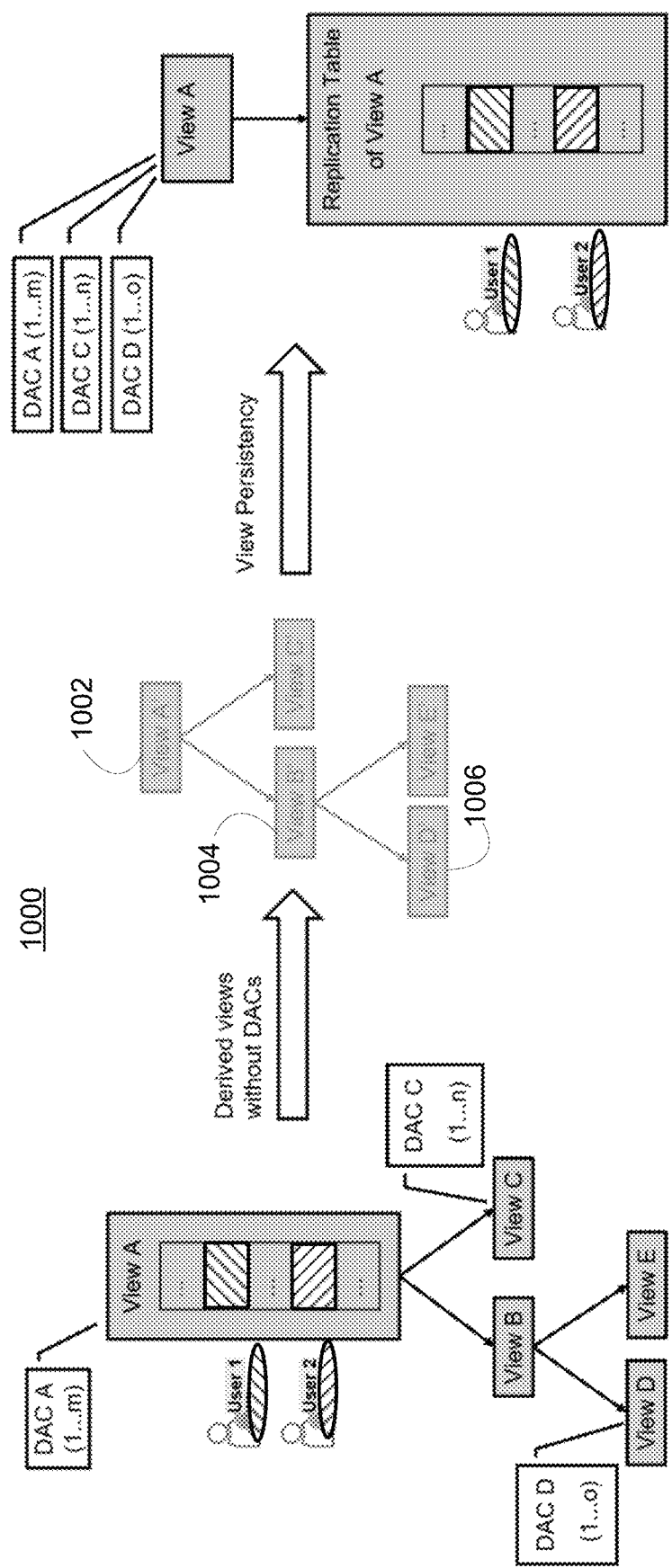
FIG. 10 illustrates an example of view persistency according to an embodiment.

Rather than switching the DAC into a special mode during view persistency, alternative embodiments may create from each view a derived view not having DACs assigned. FIG. 10 shows a simplified view of still another embodiment of data view persistency according to such an approach.

In the scenario 1000 of FIG. 10, the derived views A' 1002 and B' 1004 also consume derived views instead of consuming the original views. For example, the derived View A' consumes the derived View B', which in turn consumes the derived View D' 1006.

Thus, when reading data into the replication table, the data is read from the derived views instead of from the original views. The result is that the replication table for the View A includes all of the view data.

The approach of FIG. 10 contrasts with that of FIGS. 3-7. That is, under the approach of FIG. 10 the replication table will contain all data of the view, not merely the data for which any user is authorized to access.

Figure 11:
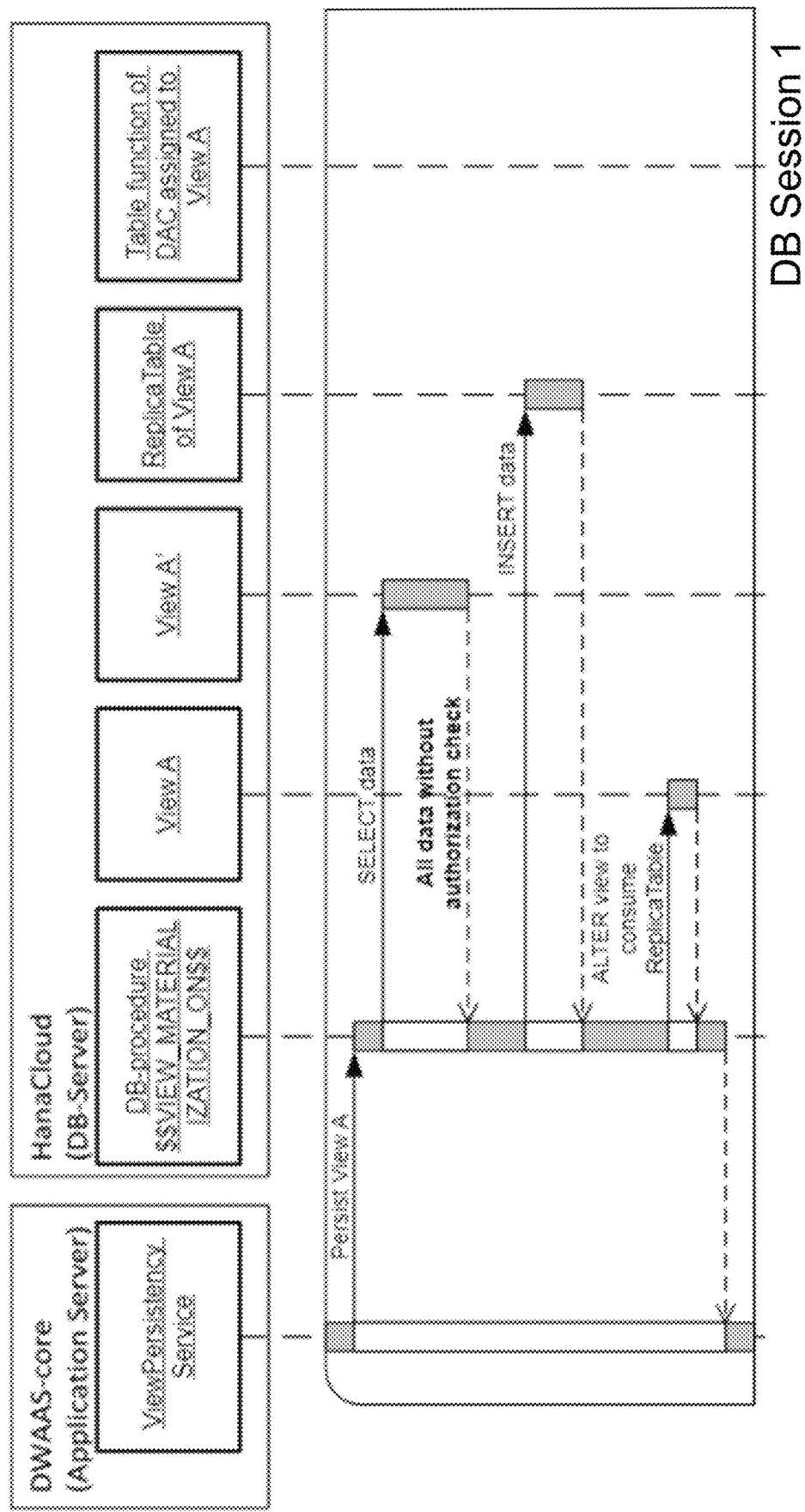
FIGS. 11-12 show simplified swim lane diagrams of database session implementing view persistency according to the embodiment illustrated in FIG. 10.
Figure 12:
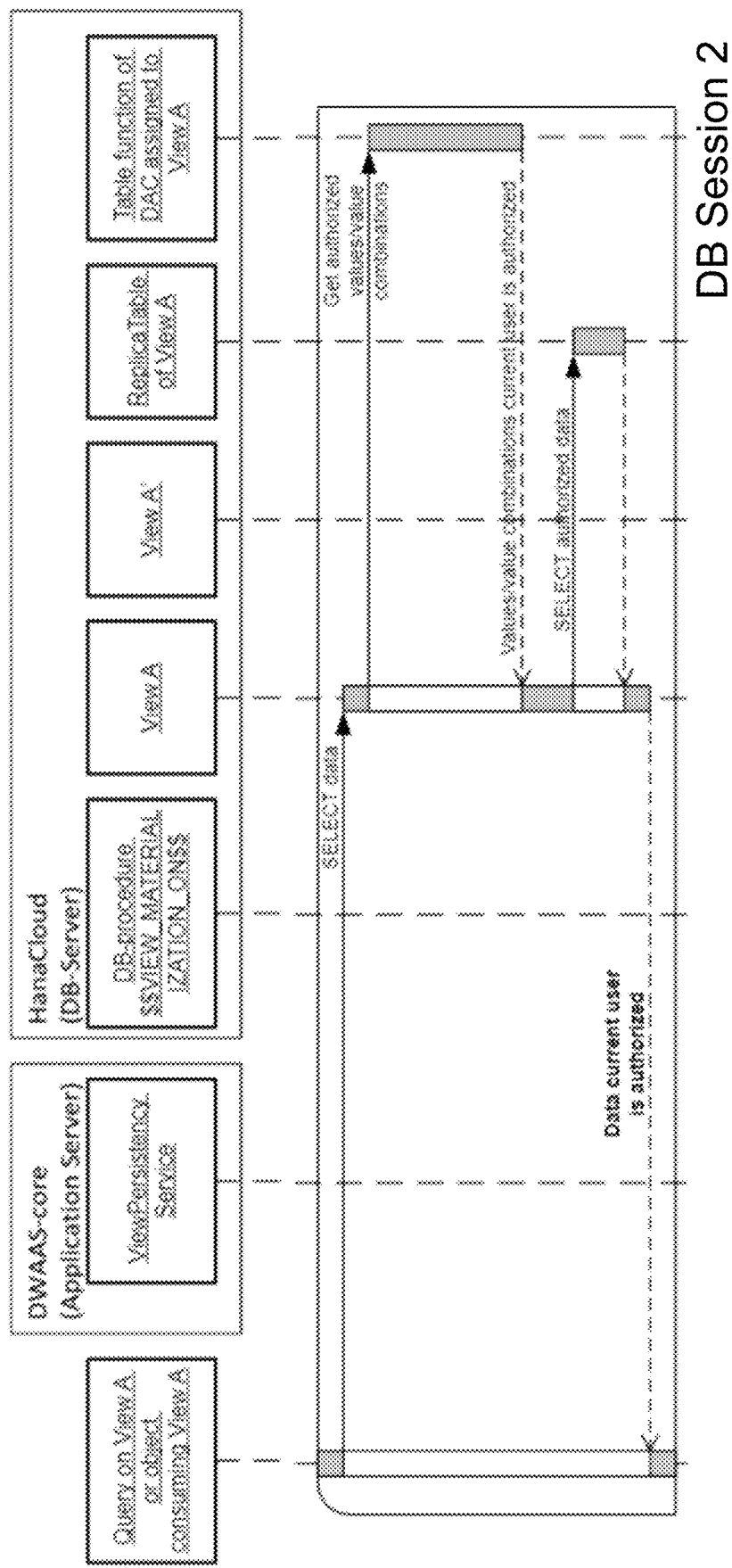

FIGS. 11-12 are simplified swim lane diagrams illustrating handling data persistency utilizing a derived view approach rather than a session variable to switch the DACs into a special mode. In the illustrated scenario of FIGS. 11-12 only the top view A has a DAC assigned; none of the consumed views has a DAC assigned. The simplified swim lane diagram of FIG. 11 shows creation of the replica table including all data of the view.

FIG. 12 shows querying or consumption of the view in a second database session, to return only data of the view that a particular user is authorized to access.

Returning now to FIG. 1, there the particular embodiment is depicted with the engine responsible for view persistence as being located outside of the database. However, this is not required.

Rather, alternative embodiments could leverage the processing power of an in-memory database engine (e.g., the in-memory database engine of the HANA in-memory database available from SAP SE), in order to perform various functions.

Figure 13:
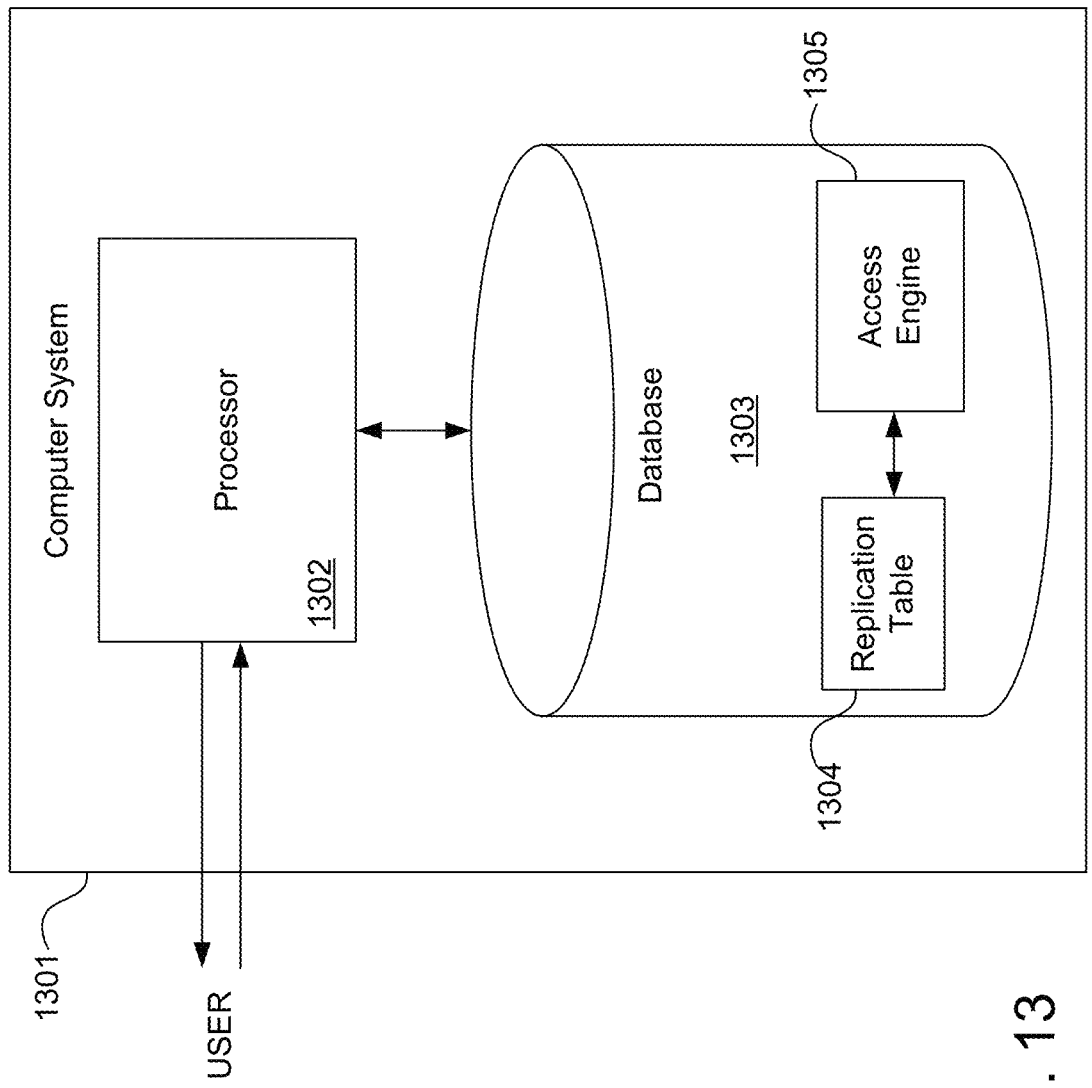
FIG. 13 illustrates hardware of a special purpose computing machine configured to implement data view persistence according to an embodiment.

Thus FIG. 13 illustrates hardware of a special purpose computing machine configured to implement table reproduction according to an embodiment. In particular, computer system 1301 comprises a processor 1302 that is in electronic communication with a non-transitory computer-readable storage medium comprising a database 1303. This computer-readable storage medium has stored thereon code 1305 corresponding to an access engine. Code 1304 corresponds to a replication table. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. Computer implemented system and methods comprising: receiving a first view comprising a plurality of pieces of data matching a query; generating a replication table from the first view by referencing a first data access control structure organized according to user access rights, the replication table comprising the plurality of pieces of data;

storing the replication table in a non-transitory computer readable storage medium; and applying the first data access control structure to the replication table to produce an output to a user, the output comprising a subset of the plurality of pieces of data.

Example 2. The computer implemented system and method of Example 1 wherein: the non-transitory computer readable storage medium comprises a database; the replication table comprises a first database table; and the first access control structure comprises a second database table.

Example 3. The computer implemented system and method of Examples 1 or 2 wherein the output is produced by a join, union, projection, aggregation or function.

Example 4. The computer implemented system and method of Examples 2 or 3 wherein:
the database comprises an in-memory database; and
the replication table is generated by an in-memory database engine of the in-memory database.

Example 5. The computer implemented system and method of Examples 1, 2, 3, or 4 wherein the replication table comprises pieces of data of the first view that are available to any user.

Example 6. The computer implemented system and method of Examples 1, 2, 3, 4, or 5 wherein:
the replication table is generated during a first database session; and
the output is produced during a second database session.

Example 7. The computer implemented system and method of Examples 1, 2, 3, 4, 5, or 6 wherein:
the first data access control structure is further organized according to a dimension; and
the subset of the plurality of pieces of data is limited to the dimension.

Example 8. The computer implemented system and method of Examples 1, 2, 3, 4, 5, 6, or 7 wherein:
the first view consumes a second view; and
generating the output further comprises applying a second data access control structure to the first data access control structure.

Figure 14:
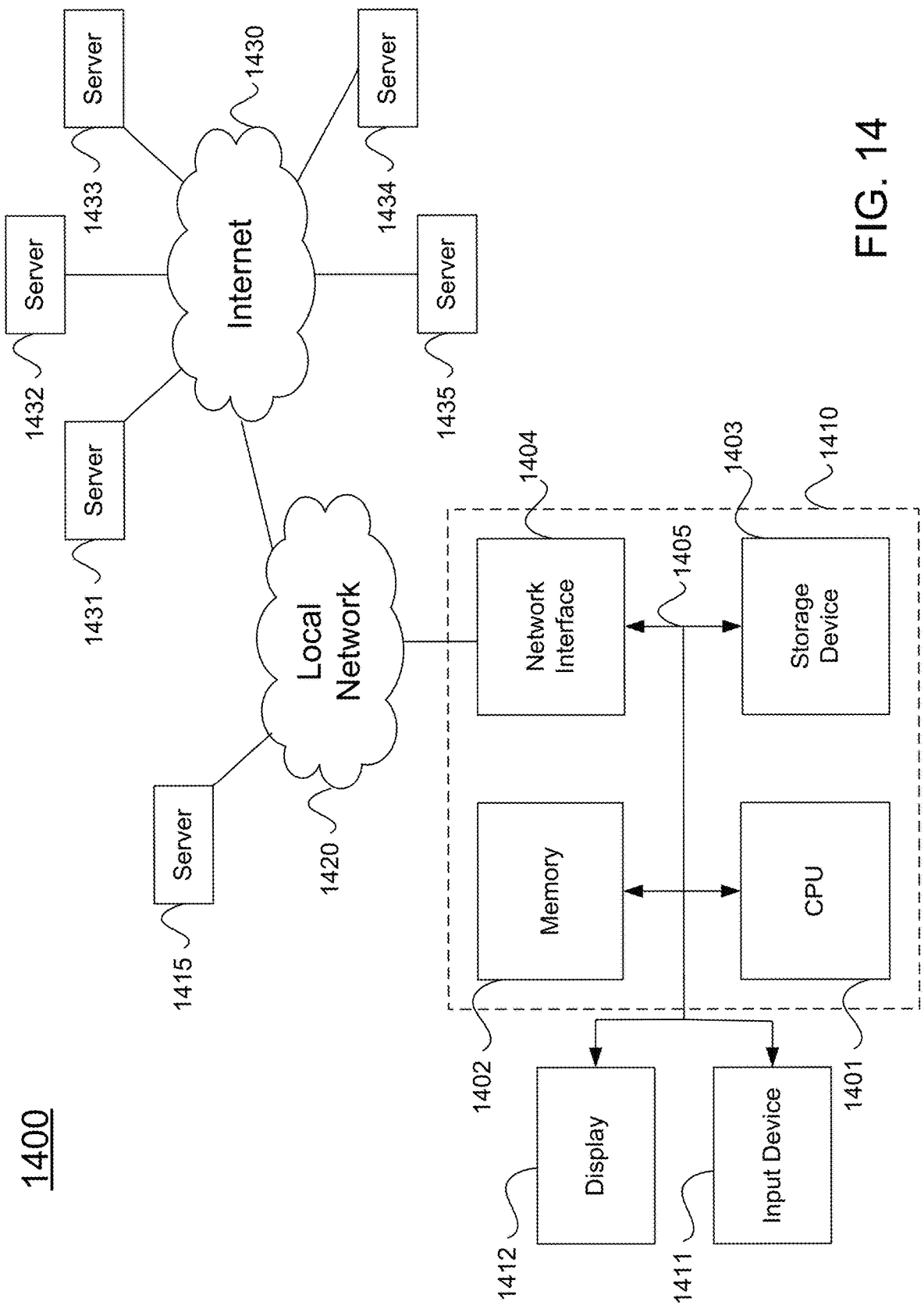
FIG. 14 illustrates an example computer system.

An example computer system 1400 is illustrated in FIG. 14. Computer system 1410 includes a bus 1405 or other communication mechanism for communicating information, and a processor 1401 coupled with bus 1405 for processing information. Computer system 1410 also includes a memory 1402 coupled to bus 1405 for storing information and instructions to be executed by processor 1401, including information and instructions for performing the techniques described above, for example. This memory may also be used for storing variables or other intermediate information during execution of instructions to be executed by processor 1401. Possible implementations of this memory may be, but are not limited to, random access memory (RAM), read only memory (ROM), or both. A storage device 1403 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 1403 may include source code, binary code, or software files for performing the techniques above, for example. Storage device and memory are both examples of computer readable media.

Computer system 1410 may be coupled via bus 1405 to a display 1412, such as a Light Emitting Diode (LED) or liquid crystal display (LCD), for displaying information to a computer user. An input device 1411 such as a keyboard and/or mouse is coupled to bus 1405 for communicating information and command selections from the user to processor 1401. The combination of these components allows the user to communicate with the system. In some systems, bus 1405 may be divided into multiple specialized buses.

Computer system 1410 also includes a network interface 1404 coupled with bus 1405. Network interface 1404 may provide two-way data communication between computer system 1410 and the local network 1420. The network interface 1404 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 1404 sends and receives electrical, electromagnetic, or optical signals that carry digital data streams representing various types of information.

Computer system 1410 can send and receive information, including messages or other interface actions, through the network interface 1404 across a local network 1420, an Intranet, or the Internet 1430. For a local network, computer system 1410 may communicate with a plurality of other computer machines, such as server 1415. Accordingly, computer system 1410 and server computer systems represented by server 1415 may form a cloud computing network, which may be programmed with processes described herein. In the Internet example, software components or services may reside on multiple different computer systems 1410 or servers 1431-1435 across the network. The processes described above may be implemented on one or more servers, for example. A server 1431 may transmit actions or messages from one component, through Internet 1430, local network 1420, and network interface 1404 to a component on computer system 1410. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method comprising:
generating a first view, the first view comprising a plurality of pieces of data matching a query, the first view being associated with a first data access control structure, wherein in a first mode, the first data access control structure limits access of a first user to a first subset of the plurality of pieces of data and limits access of a second user to a second subset of the plurality of pieces of data;
displaying, in the first mode, the first subset of data to the first user;
receiving, from the first user, a request to persist the first subset of data of the plurality of pieces of data of the first view;
generating, in response to the request, a replication table from the first view, wherein generating the replication table comprises switching the first data access control structure from the first mode into a second mode, wherein in the second mode, the first data access control structure provides the first user with access to a superset of data comprising the first subset of data and the second subset of data so that the replication table comprises the first subset of data accessible by the first user and the second subset of data accessible by the second user;

storing the replication table in a non-transitory computer readable storage medium;

applying the first data access control structure to the replication table in the first mode to produce an output to the second user, the output comprising the second subset of the plurality of pieces of data; and applying the first data access control structure to the replication table in the first mode to produce an output to the first user, the output comprising the first subset of the plurality of pieces of data.

2. A method as in claim 1 wherein:
the replication table is generated during a first database session; and
the output to the first user is produced during a second database session.

3. A method as in claim 2 wherein:
the first data access control structure is switched back to regular mode by employing the database session variable within the second database session.

4. A method as in claim 1 wherein:
the first data access control structure is further organized according to a dimension;
and the first subset of the plurality of pieces of data is limited to the dimension.

5. A method as in claim 1 wherein:
the non-transitory computer readable storage medium comprises a database;
the replication table comprises a first database table; and
the first data access control structure comprises a second database table.

6. A method as in claim 5 wherein the replication table is produced by a join, union, projection, aggregation or function.

7. A method as in claim 5 wherein:
the first view consumes a second view; and
generating the replication table further comprises applying a second data access control structure to the first data access control structure.

8. A method as in claim 7 wherein:
the first data access control structure is organized according to a dimension;
the replication table is produced by an intersection.

9. A method as in claim 5 wherein:
the database comprises an in-memory database; and
the replication table is generated by an in-memory database engine of the in-memory database.

10. A method as in claim 1 wherein:
the first data access control structure is located on a processing layer of a system; and
the replication table and non-transitory computer readable medium are located on a persistence layer of a system.

11. A method as in claim 1 wherein:
the first view is instead a relational database artifact including one or more of a virtual table and a proxy object that points to a remote data entity using federation capabilities.

12. A non-transitory computer readable storage medium embodying a computer program for performing a method, said method comprising:

generating a first view, the first view comprising a plurality of pieces of data matching a query, the first view comprising a first database table, the first view being associated with a first data access control structure, wherein in a first mode, the first data access control structure limits access of a first user to a first subset of the plurality of pieces of data and limits access of a second user to a second subset of the plurality of pieces of data;

displaying, in the first mode, the first subset of data to the first user;

receiving, from the first user, a request to persist the first subset of data of the plurality of pieces of data of the first view;

generating, in response to the request, a replication table from the first view, wherein generating the replication table comprises switching the first data access control structure from the first mode into a second mode, wherein in the second mode, the first data access control structure provides the first user with access to a superset of data comprising the first subset of data and the second subset of data so that the replication table comprises the first subset of data accessible by the first user and the second subset of data accessible by the second user;

storing the replication table in a database;

applying the first data access control structure to the replication table in the first mode to produce an output to the second user, the output comprising the second subset of the plurality of pieces of data; and applying the first data access control structure to the replication table in the first mode to produce an output to the first user, the output comprising the first subset of the plurality of pieces of data.

13. A non-transitory computer readable storage medium as in claim 12 wherein:
the replication table is generated during a first database session; and
the output to the first user is produced during a second database session.

14. A non-transitory computer readable storage medium as in claim 12 wherein:
the first data access control structure is further organized according to a dimension;
and the first subset of the plurality of pieces of data is limited to the dimension.

15. A non-transitory computer readable storage medium as in claim 12 wherein:
the first view consumes a second view; and
generating the replication table further comprises applying a second data access control structure to the first data access control structure, wherein the second data access control structure is organized according to a dimension and the replication table is produced by an intersection.

16. A computer system comprising:
one or more processors;
at least one memory; and
a software program, executable on said computer system, the software program configured to cause an in-memory database engine of an in-memory database to:
generate a first view, the first view comprising a plurality of pieces of data matching a query, the first view being associated with a first data access control structure, wherein in a first mode, the first data access control structure limits access of a first user to a first subset of the plurality of pieces of data and limits access of a second user to a second subset of the plurality of pieces of data;

generate, in response to the request, a replication table from the first view, wherein generating the replication table comprises switching the first data access control structure from the first mode into a second mode, wherein in the second mode, the first data access control structure provides the first user with access to a superset of data comprising the first subset of data and the second subset of data so that the replication table comprises the first subset of data accessible by the first user and the second subset of data accessible by the second user;

store the replication table in the in-memory database;

apply the first data access control structure to the replication table in the first mode to produce an output to the second user, the output comprising the second subset of the plurality of pieces of data; and apply the first data access control structure to the replication table in the first mode to produce an output to the first user, the output comprising the first subset of the plurality of pieces of data.

17. A computer system as in claim 16 wherein the in-memory database engine is configured to:
generate the replication table during a first database session; and
produce the output to the first user during a second database session.

18. A computer system as in claim 16 wherein:
the replication table comprises a first database table;
the first access control structure comprises a second database table; and
the replication table is produced by a join, union, projection, aggregation or function.

19. A computer system as in claim 18 wherein:
the first view consumes a second view; and
generating the replication table further comprises applying a second data access control structure to the first data access control structure.

20. A computer system as in claim 19 wherein:
the first data access control structure is organized according to a dimension;
the second data access control structure is organized according to the dimension; and
the replication table is produced by an intersection.

* * * * *

UNITED STATES PATENT AND TRADEMARK OFFICE
CERTIFICATE OF CORRECTION

| | |
|---|---|
| PATENT NO. | : 12,061,712 B2 |
| APPLICATION NO. | : 17/514983 |
| DATED | : August 13, 2024 |
| INVENTOR(S) | : Michael Wilking et al. |

Page 1 of 1

It is certified that error appears in the above-identified patent and that said Letters Patent is hereby corrected as shown below:

On the Title Page

Item (72) Inventors: Michael Wilking, please delete - "Dublin(IE)" and insert --Germany (Zuzenhausen)--.

Signed and Sealed this
Twenty-second Day of April, 2025

Coke Morgan Stewart
*Acting Director of the United States Patent and Trademark Office*